3,198,626
URANIUM-CHROMIUM-ALUMINUM TERNARY ALLOY
Gilbert S. Layne and James O. Huml, Midland, Mich., assignors to The Dow Chemical Company, Midland, Mich., a corporation of Delaware
No Drawing. Filed June 13, 1963, Ser. No. 287,499
2 Claims. (Cl. 75—122.5)

This invention relates to a novel uranium containing alloy and more particularly is concerned with a new and useful ternary intermetallic compound of uranium-chromium-aluminum.

The alloy of the present invention is suitable for use as a nuclear reactor fuel element composition. Its high utility in this area is based on the facts that (1) the component elements have a low thermal neutron cross-section; (2) the alloy has a melting point of above 800° C.; and, (3) the alloy is chemically less reactive than is aluminum uranium alloy. This ternary alloy therefore, because of the hereinbefore listed characteristics, is particularly suitable for use in those reactor applications in which uranium-aluminum binary alloys presently are used.

The novel alloy composition of the present invention is a ternary intermetallic compound corresponding to the formula $UCr_2Al_{21}$ and comprises on a weight basis about 26.2 percent uranium, about 11.4 percent chromium and about 62.4 percent aluminum.

The compound is prepared by employing alloying, melting, casting and other foundry techniques as known to one skilled in the art. The following example will serve to illustrate a method which can be used to prepare the instant novel metallic composition but is not meant to to be limiting.

*Example*

An alloy of about 200 grams of aluminum and about 10 grams of uranium was prepared by melting the two components together at about 800° C. in a graphite crucible under an argon atmosphere. About 4.25 grams of chromium then were added to the melt and the resulting mixture stirred at about 800° C. fo about 4 hours. A solid, crystalline product settled out during this period. Elemental analysis indicated this material to be the novel intermetallic compound corresponding to the empirical formula $UCr_2Al_{21}$. X-ray diffraction analysis of this product showed the product had the following lattice constants: $a=10.191$ A., $b=10.191$ A., $c=14.412$ A. The cell volume was 1496.78. The calculated density was 4.030 grams/cc. There were four molecules per unit cell.

We claim:
1. A ternary metal alloy comprising on a weight basis about 26.2 weight percent uranium, about 11.4 weight percent chromium and about 62.4 weight percent aluminum.
2. A ternary intermetallic compound corresponding to the formula $UCr_2Al_{21}$.

References Cited by the Examiner

UNITED STATES PATENTS 2,043,885   6/36   Keller _____ 75—122.5
3,098,742   7/63   Lane et al. _____ 75—122.5

OTHER REFERENCES

Atomic Energy Commission Document BMI-1278, "Survey of Ternary and Quaternary Metastable Gamma-Phase Uranium Alloys," July 15, 1958.

CARL D. QUARFORTH, *Primary Examiner.*
REUBEN EPSTEIN, *Examiner.*